UNITED STATES PATENT OFFICE.

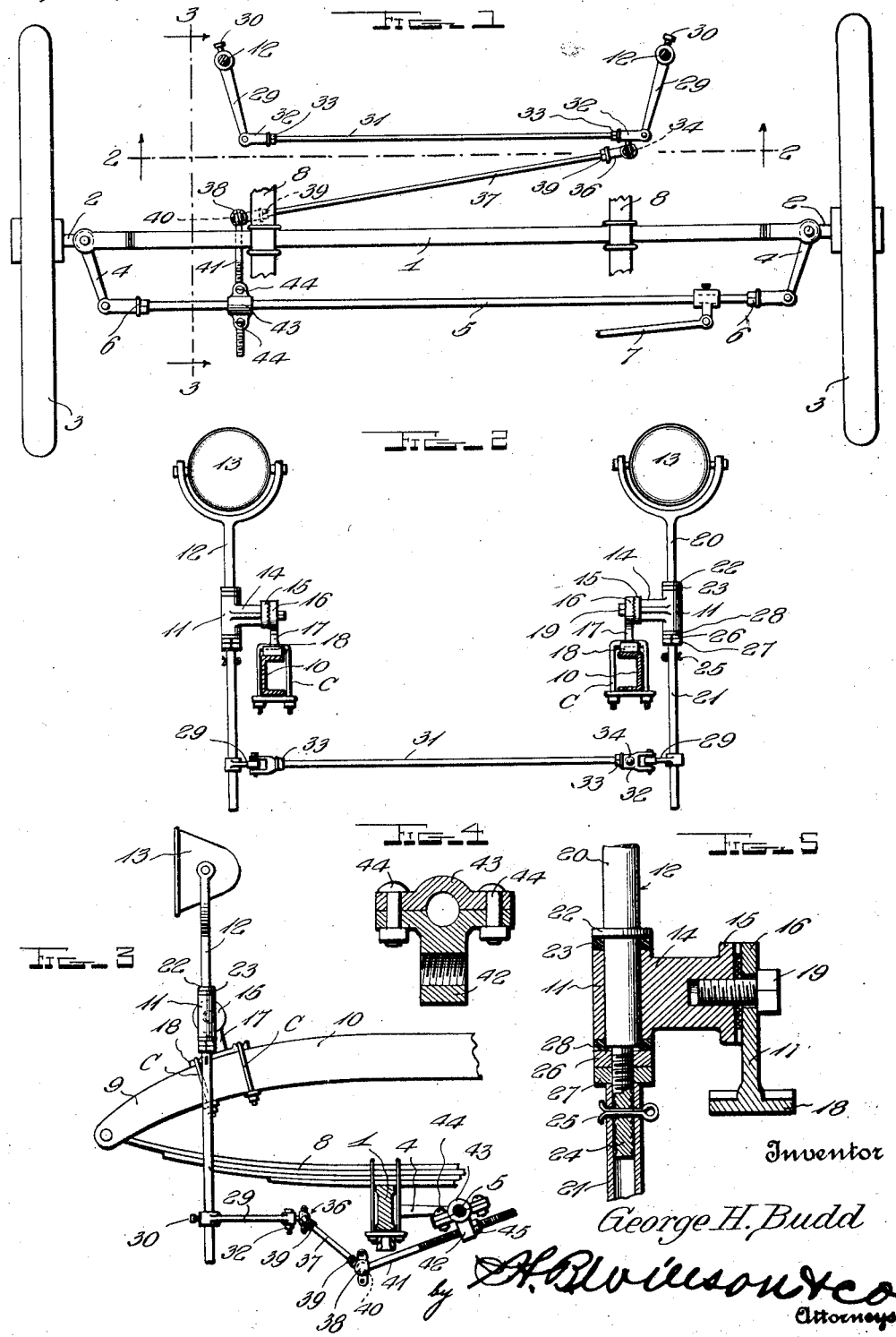

GEORGE H. BUDD, OF SALT LAKE CITY, UTAH.

DIRIGIBLE HEADLIGHT.

1,350,252.  Specification of Letters Patent.  Patented Aug. 17, 1920.

Application filed April 15, 1919. Serial No. 290,209.

*To all whom it may concern:*

Be it known that I, GEORGE H. BUDD, a citizen of Canada, residing at Salt Lake City, in the county of Salt Lake and State of Utah, have invented certain new and useful Improvements in Dirigible Headlights; and I do declare the following to be a full, clear, and exact description of the invention, such as will enable others skilled in the art to which it appertains to make and use the same.

My invention relates to improvements in automobile headlights and has for its object to provide an extremely simple and inexpensive, yet a highly efficient and desirable arrangement of parts capable of application to numerous makes of machines, for turning the headlights thereof simultaneously with steering of the wheels.

I am aware that numerous dirigible headlights have heretofore been devised, but most of them are either very expensive and complicated or require that alterations be made in the machine before they can be installed. Due to the extreme simplicity of the present invention however and its novel construction, the device can be inexpensively manufactured and marketed and employed universally upon the numerous types of machines now in use.

With the foregoing in view, the invention resides in the novel construction and arrangement of parts hereinafter described and claimed, reference being made to the accompanying drawing.

Figure 1 is a top plan view of the headlight operating mechanism showing its association with the front axle and the front wheel steering means of an automobile, the vertical shafts of the headlights being shown in horizontal section.

Fig. 2 is a vertical transverse section on the plane of the line 2—2 of Fig. 1.

Fig. 3 is a side elevation with parts in section on the plane indicated by the line 3—3 of Fig. 1.

Fig. 4 is an enlarged section of the clamp by means of which the main operating arm is secured to the usual steering rod.

Fig. 5 is an enlarged vertical section of one of the bearings for the headlight shafts.

In the drawing above briefly described, the numeral 1 designates the front axle of an automobile, 2 refers to the spindles carrying the front wheels 3 and equipped with the usual rearwardly extending spring arms 4 which are connected by the steering rod 5, whose ends are provided with the usual adjusting means 6 for alinement of the front wheels. On different makes of machines, the steering gear varies, but the parts so far mentioned usually remain the same. I have shown a rod 7 connected to the steering rod 5 and operated by the usual steering wheel for shifting said steering rod to guide the machine.

Springs 8 are mounted on the axle 1 and the downturned front ends 9 of the usual side bars 10 of the chassis frame, are connected to the front ends of said springs in the usual manner, and I employ these projecting bar ends as carrying means for the bearings 11 of two vertical shafts 12 which carry the headlights 13, novel provision being made whereby the bearings may be held either in truly vertical position or slightly inclined as required, so as to properly direct the rays of light from the headlights 13.

Each bearing 11 is provided with a lateral arm 14 having a flat toothed head 15 on its free end, the teeth of said head meshing with similar teeth on another head 16 on the upper end of a vertical arm 17. The arm 17 is provided with an elongated base 18 which may be secured by U-clips or the like C to the side bars 10. A set screw 19 passes through the heads 16 and 15 and is threaded in the arm 14, and by means of this screw and the teeth of said heads, the bearing 11 may be set vertically at any required position, whether the base 18 is clamped on the downturned ends 9 of the bars 10 or on a horizontal part of said bars. Furthermore, the construction in question permits proper positioning of the bearing on different makes of machines in which the curvature at the ends of the bars 10 varies.

Each shaft 12 is preferably formed of upper and lower sections 20 and 21, each upper section being of solid formation and having its lower portion received rotatably in the bearing 11, being provided with an outstanding flange or other shoulder 22 between which and the bearing 11, a washer 23 of fiber or the like is placed. The lower extremity of the upper section 20 is reduced and threaded at 24 and is received in the upper end of the lower section 21, and for inexpensive manufacture and lightness, said lower section is preferably formed of metal tubing. The reduced end 24 may be secured in the section 21 in any preferred manner but I have illustrated a cotter pin 25 for this purpose. A clamping nut 26 and a locknut 27 are threaded on the reduced end 24 of the shaft section 20, and a washer 28 of fiber or other suitable material is interposed between said clamping nut and the lower end of the bearing 11. The two washers 23 prevent rattling and exclude dust and grit from the bearing and by adjusting the nuts 26 and 27, wear may be compensated for whenever required.

Crank arms 29 are secured by set screws or the like 30 to the lower ends of the shafts 12, said arms converging rearwardly to the same extent as the steering arms 4, in order that the headlights on the wheels may be turned in the proper relative manner, and the rear ends of said crank arms are connected by a transverse rod 31 having forks 32 threaded adjustably on its ends and provided with locknuts 33. Whenever the means 6 are adjusted to properly aline the front wheels 3, the forks 32 may similarly be adjusted if required, but this adjustment is intended principally to adapt the device for use upon different machines, necessitating that the headlight shafts 12 be spaced different distances apart. In fact, the rod 31 as manufactured is of a length adequate for the widest machine frames and is cut off at the required point when the device is installed on others.

One of the forks 32 is provided with a rearwardly extending neck having a ball 34 which is received in a socket member 36, said member being adjustably threaded on one end of a transverse operating rod 37 which is located between the rods 31 and 5. The other end of the rod 37 carries an additional socket member 38 and locknuts 39 are used for securing said socket members with respect to the rod after the necessary relative adjustment has been made. Like the rod 31, the rod 37 is manufactured of a length adequate to meet conditions requiring that it be rather long, and when other conditions are encountered, said rod is cut off to the required length.

The socket member 38 receives a ball 40 on the front end of a main operating arm 41 which may extend under or over the axle 1, according to the make of machine. The rear end of the arm 41 is threaded through a boss 42 on a clamp 43 which is secured on the steering rod 5 by means of bolts or the like 44. It will be seen that the clamp 43 may slide and turn upon the rod 5 before it is tightened and that the arm 41 may thus be positioned at the required location for clearing all parts when the machine is steered. When the arm extends under the axle as shown in Fig. 3, the lug 42 depends from the clamp 43, but said clamp is inverted when the arm must extend over the axle. Due to threading of the arm 41 through the lug 42, said arm may be adjusted forwardly and rearwardly to the required extent for properly positioning the same upon numerous designs of machines, and a locknut 45 may be employed for holding said arm in adjusted position.

In order to install the attachment upon a machine, it is simply necessary to mount the usual headlights upon the shafts 12, whose upper ends may of course vary in design for this purpose; to clamp the bases 18 of the bearings 11 upon the chassis frame; to properly adjust the shafts 12 to or near vertical positions and tighten the screws 20; to cut the rods 31 and 37 the proper length and connect them to the parts with which they coöperate; to secure the clamp 43 on the steering rod 5 at the proper angle for locating the arm 41 as required; and to thread said arm forwardly or rearwardly as required. After final adjustment of the several parts has been made, the several locknuts, screws and other fasteners used are tightened.

It will be seen from the foregoing, that I have provided an extremely simple headlight steering attachment which may be easily manufactured and installed upon numerous makes of machines, yet that the device will be highly efficient and reliab'e for turning the headlights when the machine is steered. Due to the rearward converging of the arms 29, and the connecting rod 31, the lights are properly turned with relation to the wheels 3 and may be accurately adjusted; by employing the relatively long rod 37 and the ball joints at the ends thereof, the vertical movement of the axle and associated parts with respect to the chassis frame, is taken care of and in addition these ball joints permit all necessary movement in all directions; by providing the clamp 43 which may be turned upon the steering rod 5 prior to final clamping; the arm 41 may be located at the most desirable point; and by threading arm 41 through a part of the clamp 43, the active length of said arm may be varied as required.

Since probably the best results are obtainable from the exact details disclosed, they may well be followed, but within the scope of the invention as claimed, numerous minor changes may well be made.

I claim:

A headlight steering attachment for automobiles including a vertical bearing, an upper light-carrying shaft section having its lower end rotatably received in said bearing, a shoulder on said shaft section disposed at the upper end of the bearing, the lower end of said shaft section being reduced and extending below the bearing, a nut threaded on said reduced end, said nut and said shoulder preventing sliding of said shaft section in said bearing, and a lower tubular light-turning shaft section receiving said reduced end of said upper section and secured thereto.

In testimony whereof I have hereunto set my hand.

GEO. H. BUDD.